United States Patent
Hou et al.

[19]

[11] Patent Number: 6,163,453

[45] Date of Patent: Dec. 19, 2000

[54] HEAT DISSIPATION ENHANCING DEVICE

[75] Inventors: Kai-Shing Hou, Chino Hills, Calif.; Yung-Chou Chen, Tu-Chen, Taiwan; Richard Lee; Stanley Chen, both of Taipei, Taiwan; Allen Tan, Yung-Ho, Taiwan; Jeff Luo, Tu-Chen, Taiwan

[73] Assignee: Foxconn Precision Components Co., Ltd., Taiepi Hsein, Taiwan

[21] Appl. No.: 09/404,230

[22] Filed: Sep. 23, 1999

[30] Foreign Application Priority Data

Dec. 28, 1998 [TW] Taiwan ................... 87121725

[51] Int. Cl.$^7$ ................. H05K 5/00; H05K 7/00
[52] U.S. Cl. ............ 361/687; 301/688; 301/692; 301/693; 301/694; 301/695
[58] Field of Search ................. 361/687, 688, 361/692, 693, 694, 695; 62/259.2; 454/184

[56] References Cited

U.S. PATENT DOCUMENTS 5,813,243  9/1998  Johnson et al. ............... 62/259.2
5,963,424  10/1999  Jileman et al. ............... 361/695
6,021,042  2/2000  Anderson et al. ............... 361/687

*Primary Examiner*—Leo P. Picard
*Assistant Examiner*—Tung Minh Bui
*Attorney, Agent, or Firm*—We Te Chung

[57] ABSTRACT

A fan duct induces an air flow generated by a fan of a lower supply of a computer to flow simultaneously through at least two heat-generating components of the computer. The fan dut is formed by plastic injection molding to have a cuboidal configuration, defining a first opening in alignment with the fan, a second opening proximate a first heat-generating component, and a third opening proximate a second heat-generating component when the fan duct is mounted in the computer at a predetermined position. When the fan is operated in a direction to draw air from the computer, an air flow is generated to simultaneously flow through the two heat-generating components and into the fan duct via the second and third openings. The heated air is then expelled out of the fan duct via the first opening to reach an exterior of the computer.

8 Claims, 3 Drawing Sheets

HEAT DISSIPATION ENHANCING DEVICE

BACKGROUND OF THE INVENTION

1. Field of the Invention

The present invention relates to a device for enhancing heat dissipating effectiveness of a computer, and particularly to a fan duct used in a computer which induces an air flow generated by an electrical fan to simultaneously flow through multiple heat-generating components in the computer for enhancing the cooling effectiveness thereof.

2. The Prior Art

Due to the increase in the operating speed of a computer, the consumed power of some computer components (usually a CPU, a hard disc drive and some power chips) increases accordingly, resulting in an increased temperature thereof. Should the heat of these components not be effectively and timely dissipated, a malfunction or instability of operation of the computer will result.

Conventionally, an air flow generated by a power supply fan of the computer is utilized to remove the heat generated by the heat-generating components therefrom. However, due to the compact design of many current computers resulting in an increasing number of components being accommodated in an increasingly limited space, the air flow generated by the power supply fan may be hindered by some electronic devices (particularly electronic cards) in the computer from effectively flowing through one or more of the heat-generating components. Thus, an over-heating problem exists in many recently developed computers having a compact design, such as the MICRO ATX computer.

To solve this problem, an additional fan has been proposed for being serially connected with the power supply fan thereby increasing the air flow through the heat-generating components. However, the two serially arranged fans will cause an acoustic problem during operation. Furthermore, more power is consumed when driving two electrical fans. Thus, addressing the over-heating problem by providing an additional fan serially connected with the power supply fan is not advantageous.

The present invention proposes a device to be mounted in a computer which can direct an air flow generated by a power supply fan to simultaneously flow through two or more heat-generating components to remove heat therefrom thereby enhancing the cooling effectiveness of the computer without the use of an additional fan.

SUMMARY OF THE INVENTION

Accordingly, an objective of the present invention is to provide a device which can improve the cooling effectiveness of a computer without the use of an additional fan or an increase in consumed power.

To fulfill the above mentioned objective, according to one embodiment of the present invention, a fan duct is formed by plastic injection molding. The fan duct has a hollow cuboidal configuration defining a first opening, a second opening and a third opening. When the fan duct is mounted in a computer, the first opening is aligned with a fan of a power supply of the computer, the second opening is proximate a first heat-generating component of the computer, i.e., a CPU, and the third opening is proximate a second heat-generating component of the computer, i.e., a hard disc drive. When the electrical fan is operated to draw air out of the fan duct, an air flow is simultaneously directed through the heat-generated components and into the fan duct. Hot air is then expelled out of the fan duct via the first opening to an exterior of the computer. Thus, the present invention does not require an additional fan to be serially connected with the power supply fan in order to achieve the effective cooling of two or more heat-generating components of a computer.

DETAILED DESCRIPTION OF THE PREFERRED EMBODIMENTS

Reference will now be made in detail to the preferred embodiments of the present invention.

Figure 1:
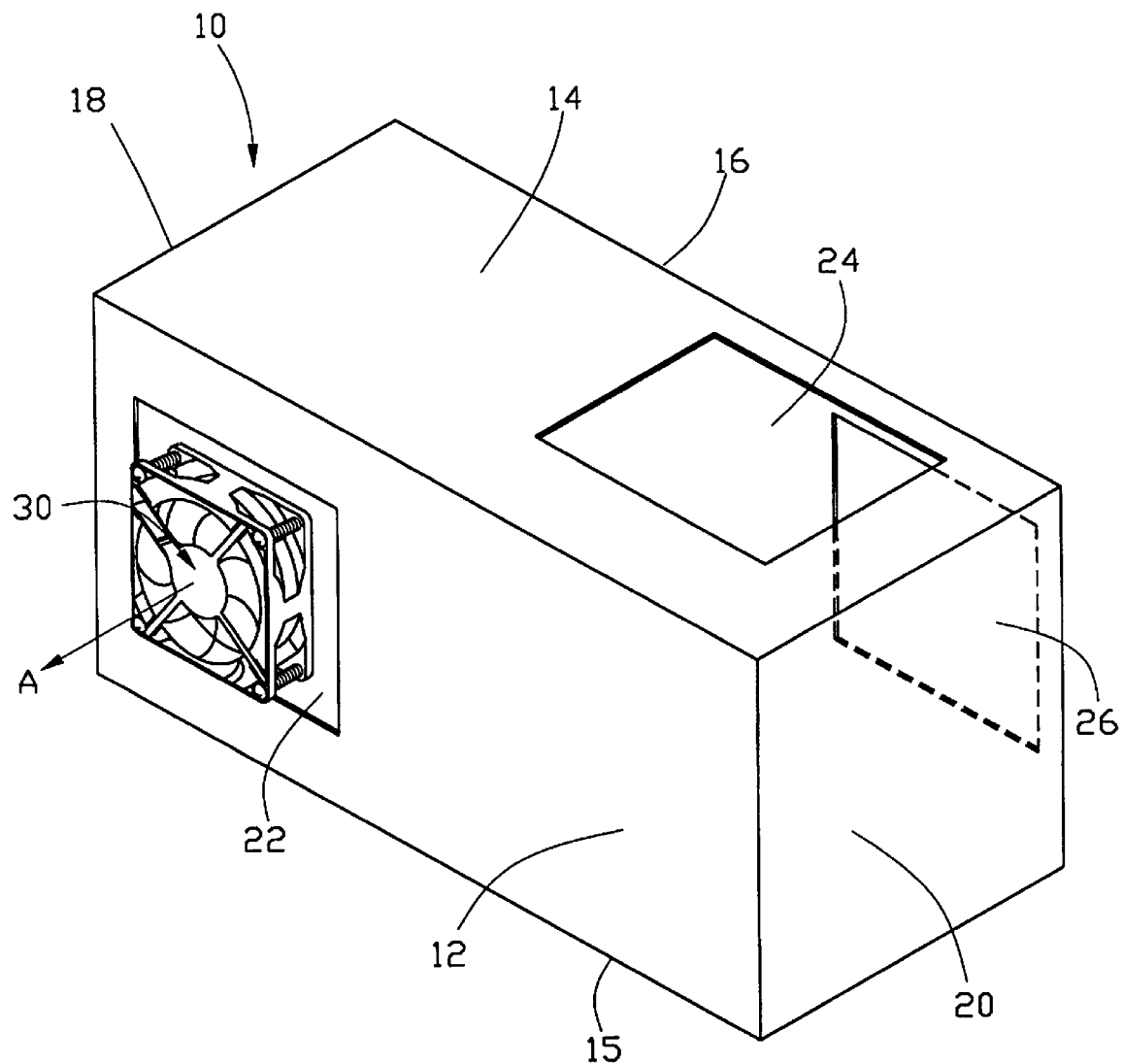
FIG. 1 is a perspective view of a fan duct in accordance with a first embodiment of the present invention and an electrical fan of a power supply of a computer.

Referring to FIG. 1, a fan duct 10 in accordance with a first embodiment of the present invention is formed by plastic injection molding to have a hollow cuboidal configuration with front, rear, top, bottom, left side and right side walls 12, 16, 14, 15, 18, 20. A first opening 22 is defined in the front wall 12 proximate the left side wall 18. A second opening 24 is defined in the top wall 14 proximate the right side wall 20. A third opening 26 is defined in the rear wall 16 proximate the right side wall 20. The fan duct 10 is mounted in a computer (not shown), particularly a MICRO ATX computer, such that the first opening 22 aligns with an electrical fan 30 of a power supply (not shown) in the computer. The second and third openings 24, 26 are positioned proximate a hard disc drive and a CPU (not shown) of the computer, respectively. When the fan 30 is activated to generate an air flow in a direction indicated by arrow "A", an air flow is also generated through the hard disc drive and the CPU and into the fan duct 10 via the second opening 24 and the third opening 26, respectively, whereby heat generated by the CPU and hard disc drive is directed into the fan duct 10. The heated air is expelled out of the fan duct 10 by the fan 30 via the first opening 22 and reaches an exterior of the computer whereby the CPU and the hard disc drive can operate below a rating temperature thereof to enable normal operation of the computer.

Figure 2:
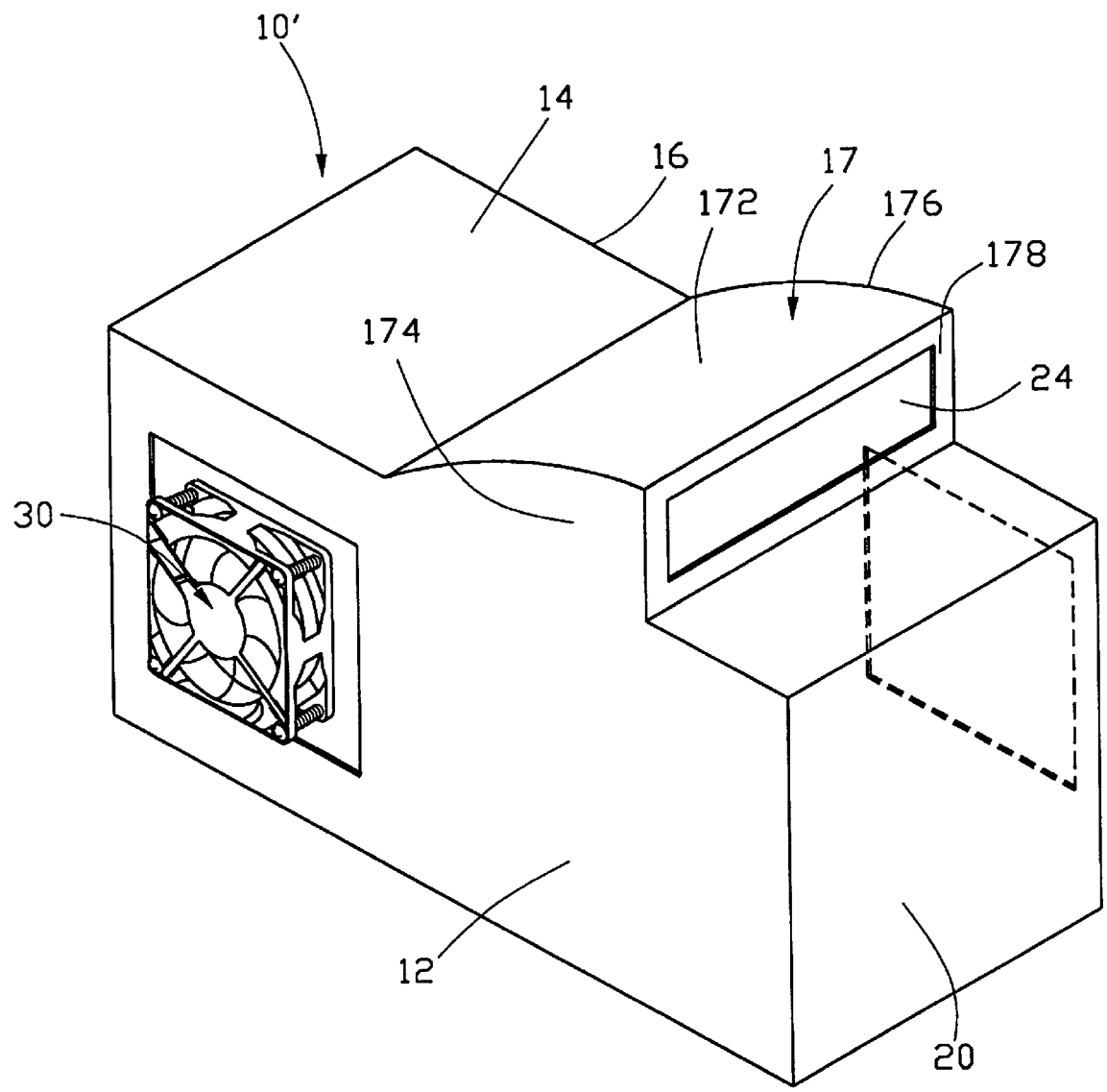
FIG. 2 is a perspective view of a fan duct in accordance with a second embodiment of the present invention and the electrical fan.

FIG. 2 shows a fan duct 10' in accordance with a second embodiment of the present invention which is substantially the same as the first embodiment with the following exceptions. A protrusion 17 is formed on the top wall 14 of the fan duct 10'. The protrusion 17 is configured to have an arced roof 172 projecting upwardly from the top wall 14 toward the right side wall 20, a substantially triangle front flap 174 extending downward from the roof 172 to connect with the front wall 12, a substantially triangle rear flap 176 extending from the roof 172 to connect with the rear wall 16, and a rectangular right side flap 178 formed between the top wall 14, the roof 172 and the front and rear flaps 174, 176. In this embodiment, the second opening 24 is defined in the right side flap 178 of the protrusion 17 whereby the hard disk drive can be precisely positioned proximate the second opening 24. Thus, when the fan 30 is activated, more heat generated by the hard disc drive can be directed by the air flow into the fan duct 10' via the second opening 24. Furthermore, due to the provision of the arced roof design, the air flow can be more smoothly directed into the fan duct 10'.

Figure 3:
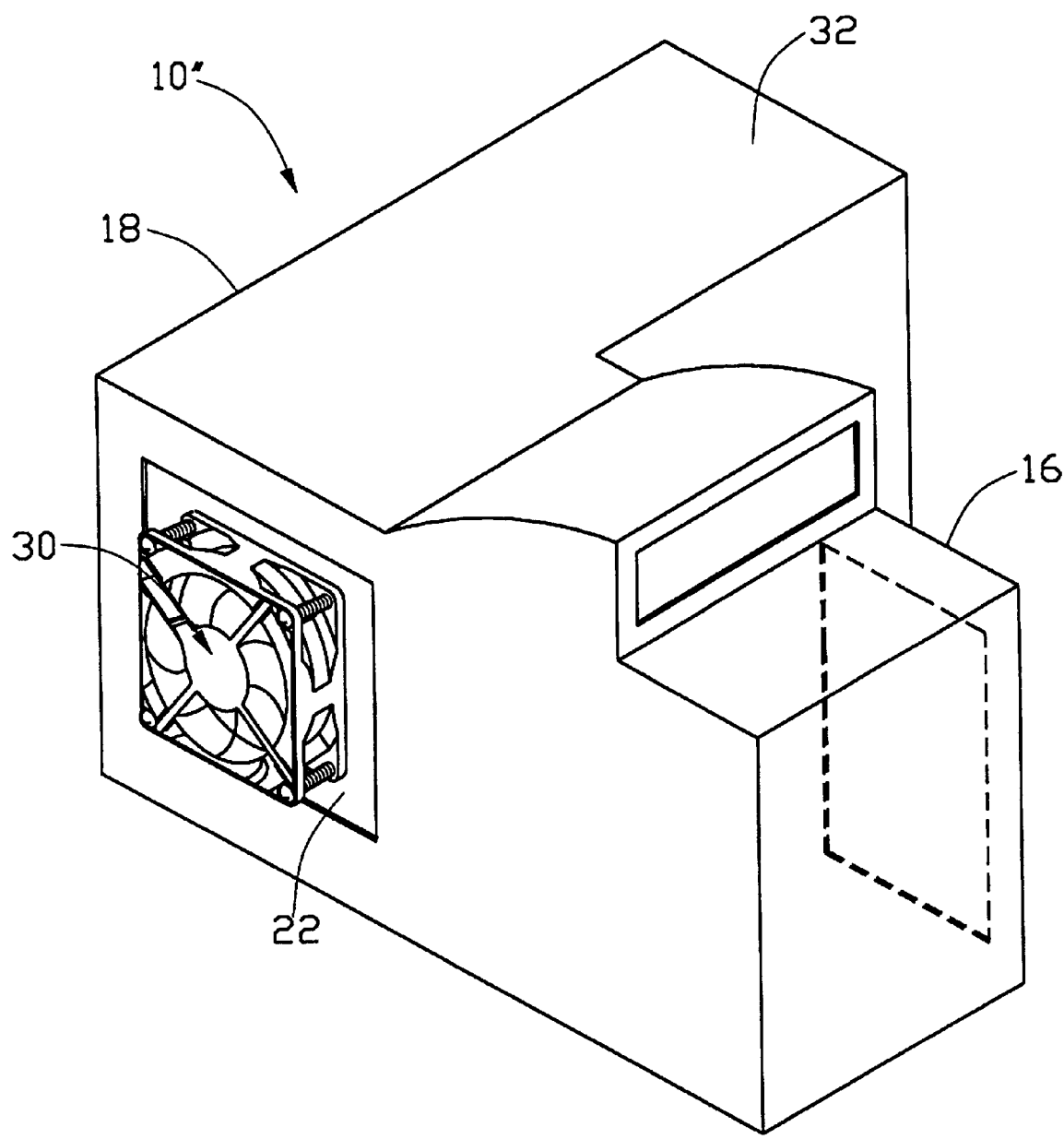
FIG. 3 is a perspective view of a fan duct in accordance with a third embodiment of the present invention and the electrical fan.

FIG. 3 shows a fan duct 10" in accordance with a third embodiment of the present invention which is substantially the same as the second embodiment with the following exceptions. An extension 32 is formed rearwardly from the rear wall 16 proximate the left side wall 18 and defines an air chamber therein. The air chamber is aligned with the first opening 22, and, thus, the fan 30. The air chamber is devised to provide more air for the fan 30 to draw when the fan 30 is activated thereby reducing the starting resistance of the fan 30. Thus, when the fan 30 is activated, an air flow can be quickly created to flow through the CPU and hard disc drive and effectively displace heat generated thereby.

Although the disclosed preferred embodiments are more suitable for use with a Micro ATX computer, it can be readily seen by those skilled in the art that the shape of the fan duct can be easily modified to be adapted for different types of computers. The present invention mainly concerns the use of a fan duct which defines at least two openings proximate at least two corresponding heat-generating components of a computer, and an opening in alignment with a fan, particularly, a power supply fan. Thus, when the fan is operated, heat generated by the components can be simultaneously removed therefrom by the fan through the fan duct. Moreover, in the preferred embodiments, the fan 30 is operated to draw air from the fan duct, however, it should be understood by those skilled in the art that the fan can also be operated to blow air into the fan duct.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

We claim:

1. A device mounted in a computer for improving the cooling effectiveness of the computer having at least first and second heat generating components and a power supply fan, said device comprising:

a hollow body having a substantially cuboidal configuration with front, rear, top, bottom, first side and second side walls;

a first opening defined in the front wall of the body and aligning with the fan whereby when the fan is operated, an air flow is generated through the first opening;

a second opening defined in the top wall of the body proximate the first heat generating component; and a third opening defined in the rear wall of the body proximate the second heat generating component.

2. The device in accordance with claim 1, wherein the body has an elongate configuration.

3. The device in accordance with claim 1, wherein the first opening is defined in the front wail proximate the first side wall, the second opening is defined in the top wall proximate the second side wall, and the third opening is defined in the rear wall proximate the second side wall.

4. The device in accordance with claim 1, wherein the body further comprises an air chamber in alignment with the first opening and extending in a direction away therefrom.

5. The device in accordance with claim 3, wherein the body further comprises an air chamber defined by an extension rearwardly projecting from the rear wall proximate the first side wall, the air chamber being aligned with the first opening and extending in a direction away therefrom.

6. A device for improving the heat dissipating capability of a computer by maintaining the operating temperature of at least two heat generating components of the computer below a rating temperature thereof, comprising:

an electrical fan; and a fan duct mounted in the computer, defining a first opening at a position such that when the fan is operated an air flow is directed through the first opening, a second opening proximate a first heat generating component of the computer, and a third opening proximate a second heat generating component of the computer, whereby when the fan is activated, an air flow is simultaneously directed through the first and second heat generating components to remove heat therefrom, wherein the fan being operated in a direction drawing air from the fan duct or in a direction blowing air into the fan duct.

7. The device in accordance with claim 6, wherein the fan duct further comprises an air chamber aligned with the first opening and extending in a direction away therefrom.

8. A heat transfer system mounted in a computer, comprising:

a device with a hollow body;

a first opening formed in the body, and aligned with and adjacent to a power supply fan outside the body; and a second opening formed in the body adjacent to either a harddisk drive or a CPU outside the body while within the computer; wherein heat generated by either the harddisk drive or the CPU may be removed by an air flow which is derived from the power supply fan and passes from the second opening, through the hollow body, to the first opening, and eventually out of the computer.

\* \* \* \* \*